US012641463B2

(12) United States Patent
da Silva

(10) Patent No.: US 12,641,463 B2
(45) Date of Patent: *May 26, 2026

(54) BEAM REPORTING CONFIGURATION FOR SERVING FREQUENCY MEASUREMENTS

(71) Applicant: Telefonaktiebolaget LM Ericsson (publ), Stockholm (SE)

(72) Inventor: Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

This patent is subject to a terminal disclaimer.

(21) Appl. No.: 18/219,149

(22) Filed: Jul. 7, 2023

(65) Prior Publication Data

US 2023/0354076 A1 Nov. 2, 2023

Related U.S. Application Data

(63) Continuation of application No. 16/463,286, filed as application No. PCT/SE2019/050194 on Mar. 6, 2019, now Pat. No. 11,736,965.

(Continued)

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 7/0626* (2013.01);
(Continued)

(58) Field of Classification Search
CPC . H04W 24/10; H04W 16/28; H04W 36/0088; H04W 52/241; H04B 7/0617;
(Continued)

(56) References Cited

U.S. PATENT DOCUMENTS

| | | | |
|---|---|---|---|
| 2016/0150435 | A1 | 5/2016 | Baek et al. |
| 2016/0337916 | A1 | 11/2016 | Deng et al. |
| 2017/0150487 | A1 | 5/2017 | Zhou et al. |

FOREIGN PATENT DOCUMENTS

| | | |
|---|---|---|
| CN | 106488472 A | 3/2017 |
| WO | 2016018121 A1 | 2/2016 |

(Continued)

OTHER PUBLICATIONS

Unknown, Author, "[99-bis#20][NR] TP on RRM (Ericsson)", 3GPP TSG-RAN WG2 #100 Tdoc R2-1714128, Reno, USA, Nov. 27-Dec. 1, 2017, 1-86.

(Continued)

*Primary Examiner* — Ricardo H Castaneyra
(74) *Attorney, Agent, or Firm* — Murphy, Bilak & Homiller, PLLC

(57) ABSTRACT

A wireless device configured for performing beam measurements receives measurement reporting parameters configuring the wireless device for reporting measurements and determines, for each of one or more serving frequencies corresponding to a serving cell or a neighboring cell in the serving frequency, a number of beam measurements to be maintained. The wireless device determines the number of beam measurements to be maintained based on one or more measurement reporting parameters indicating a maximum number of beams to be reported per cell. The wireless device maintains beam measurements for each of the serving frequencies according to the corresponding determined number of beam measurements to be maintained, for reporting in a measurement report.

20 Claims, 10 Drawing Sheets

400

RECEIVE MEASUREMENT REPORTING PARAMETERS CONFIGURING THE WIRELESS DEVICE FOR REPORTING MEASUREMENTS
402

DETERMINE, FOR EACH OF ONE OR MORE SERVING FREQUENCIES CORRESPONDING TO A SERVING CELL OR A NEIGHBORING CELL IN THE SERVING FREQUENCY, A NUMBER OF BEAM MEASUREMENTS TO BE MAINTAINED, WHEREIN SAID DETERMINING IS BASED ON ONE OR MORE MEASUREMENT REPORTING PARAMETERS INDICATING A MAXIMUM NUMBER OF BEAMS TO BE REPORTED PER CELL
404

MAINTAIN BEAM MEASUREMENTS FOR EACH OF THE SERVING FREQUENCIES ACCORDING TO THE CORRESPONDING DETERMINED NUMBER OF BEAM MEASUREMENTS TO BE MAINTAINED, FOR REPORTING IN A MEASUREMENT REPORT
406

Related U.S. Application Data

(60) Provisional application No. 62/642,405, filed on Mar. 13, 2018.

(51) Int. Cl.
| | |
|---|---|
| *H04B 17/327* | (2015.01) |
| *H04W 16/28* | (2009.01) |
| *H04W 36/00* | (2009.01) |
| *H04W 52/24* | (2009.01) |

(52) U.S. Cl.
CPC .......... *H04B 17/327* (2015.01); *H04W 16/28* (2013.01); *H04W 36/0088* (2013.01); *H04W 52/241* (2013.01)

(58) Field of Classification Search
CPC .. H04B 7/0626; H04B 7/0408; H04B 17/327; H04B 17/318; H04L 5/005
USPC ..... 370/329, 252, 328, 318, 331; 455/562.1, 455/522
See application file for complete search history.

(56) References Cited

FOREIGN PATENT DOCUMENTS

| WO | 2017196491 A1 | 11/2017 |
|---|---|---|
| WO | 2018083377 A1 | 5/2018 |
| WO | 2018204863 A1 | 11/2018 |

OTHER PUBLICATIONS

Unknown, Author, "Explicit indication for only beam ID reporting (Response to S005)", 3GPP TSG-RAN WG2 NR AH#3 Tdoc R2-1801333, Vancouver, Canada, Jan. 22-26, 2018, 1-5.

Unknown, Author, "Triggering of L3 filtered beam measurements", Ericsson, 3GPP TSG-RAN WG2 AH-1801 R2-1800597 (revision of R2-1713596), Vancouver, Canada, Jan. 22-26, 2018, 1-5.

Unknown, Author, "Report of 3GPP TSG RAN2#99 meeting, Berlin, Germany", 3GPP TSG-RAN WG2 meeting #99bis R2-1710001, Prague, Czech Republic, Oct. 9-13, 2017, 1-235.

Unknown, Author, "TP on RRM (Ericsson)", 3GPP TSG-RAN WG2 #100 R2-1713590, Reno, USA, Nov. 27-Dec. 1, 2017, 1-45.

3GPP, "3rd Generation Partnership Project; Technical Specification Group Radio Access Network NR Radio Resource Control (RRC) protocol specification (Release 15)", 3GPP TS 38.331 V15.0.0, Dec. 2017, 1-188.

Unknown, Author, "Beam sorting order for measurement reporting", 3GPP TSG-RAN WG2 AH-1801 R2-1801314, Vancouver, Canada, Jan. 22-26, 2018, 1-2.

Unknown, Author, "Details of events A1-A6 and need for C1-C2 events in NR", 3GPP TSG-RAN WG2 #100, R2-1713415, Reno, USA, Nov. 27-Dec. 1, 2017, 1-17.

Unknown, Author, "Discussion on measurement report", 3GPP TSG RAN WG2#NR_AdHoc#2, R2-1706895, Qingdao, China, Jun. 27-29, 2017, 1-6.

Unknown, Author, "Explicit indication for only beam ID reporting", 3GPP TSG-RAN WG2 #100 Tdoc R2-1714150, Reno, Nevada, USA, Nov. 27-Dec. 1, 2017, 1-5.

Unknown, Author, "Remaining open issues on measurement reporting in NR", 3GPP TSG-RAN WG2 #Ad Hoc, Tdoc-R2-1707286, Qingdao, China, Jun. 27-29, 2017, 1-9.

Unknown, Author, "Reporting of NR cells in L TE Measurement Report", 3GPP TSG-RAN WG2 #101 R2-1802410, Athens, Greece, Feb. 26-Mar. 2, 2018, 1-5.

400

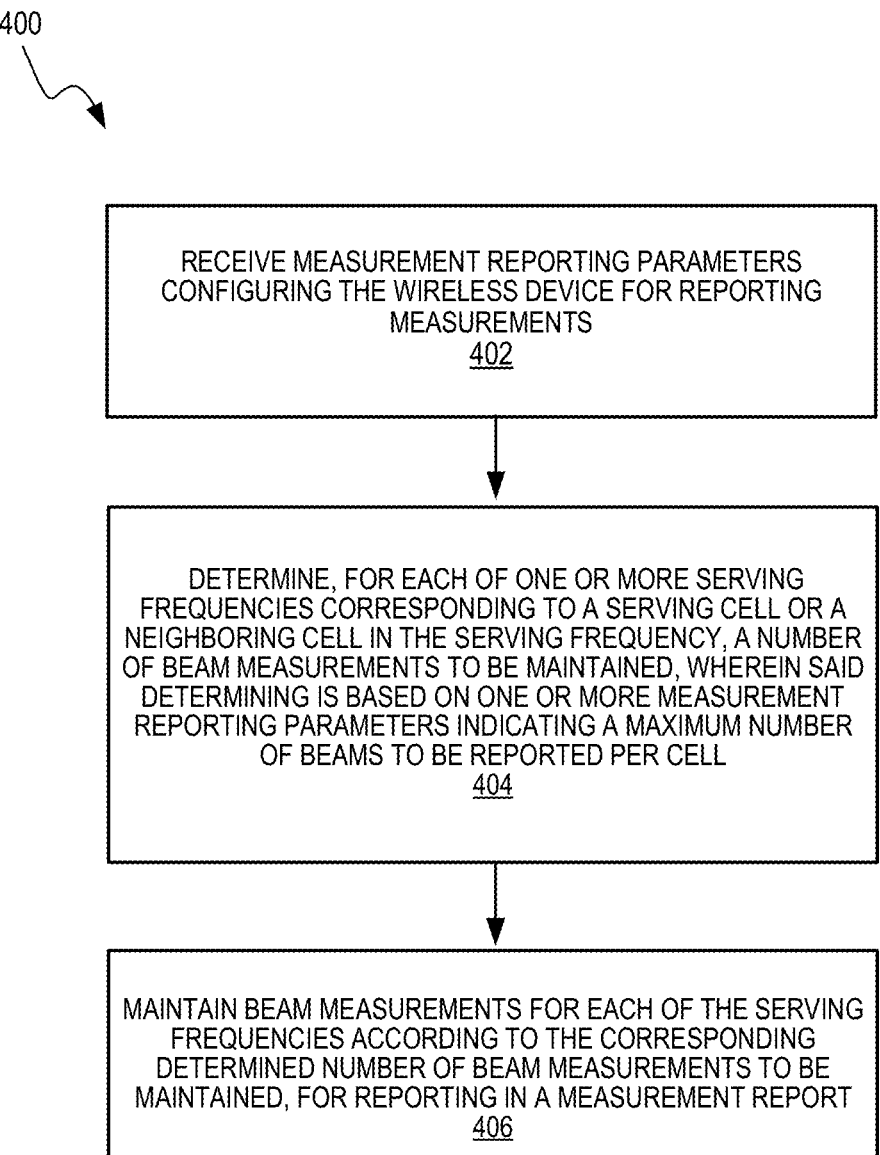

RECEIVE MEASUREMENT REPORTING PARAMETERS
CONFIGURING THE WIRELESS DEVICE FOR REPORTING
MEASUREMENTS
402

DETERMINE, FOR EACH OF ONE OR MORE SERVING
FREQUENCIES CORRESPONDING TO A SERVING CELL OR A
NEIGHBORING CELL IN THE SERVING FREQUENCY, A NUMBER
OF BEAM MEASUREMENTS TO BE MAINTAINED, WHEREIN SAID
DETERMINING IS BASED ON ONE OR MORE MEASUREMENT
REPORTING PARAMETERS INDICATING A MAXIMUM NUMBER
OF BEAMS TO BE REPORTED PER CELL
404

MAINTAIN BEAM MEASUREMENTS FOR EACH OF THE SERVING
FREQUENCIES ACCORDING TO THE CORRESPONDING
DETERMINED NUMBER OF BEAM MEASUREMENTS TO BE
MAINTAINED, FOR REPORTING IN A MEASUREMENT REPORT
406

RECEIVE MEASUREMENT REPORTING PARAMETERS
CONFIGURING THE WIRELESS DEVICE FOR REPORTING
MEASUREMENTS
502

IN RESPONSE TO DETERMINING THAT ONE OF THE
MEASUREMENT REPORTING PARAMETERS INDICATES A
MAXIMUM NUMBER OF BEAM MEASUREMENTS TO BE
REPORTED PER CELL AND ANOTHER ONE OF THE
MEASUREMENT REPORTING PARAMETERS INDICATES A
QUANTITY TO BE REPORTED, MAINTAIN AT LEAST ONE
MEASUREMENT PER BEAM FOR ONE OR MORE SERVING
FREQUENCIES OF A SERVING CELL, FOR REPORTING IN A
MEASUREMENT REPORT
504

FIG. 5

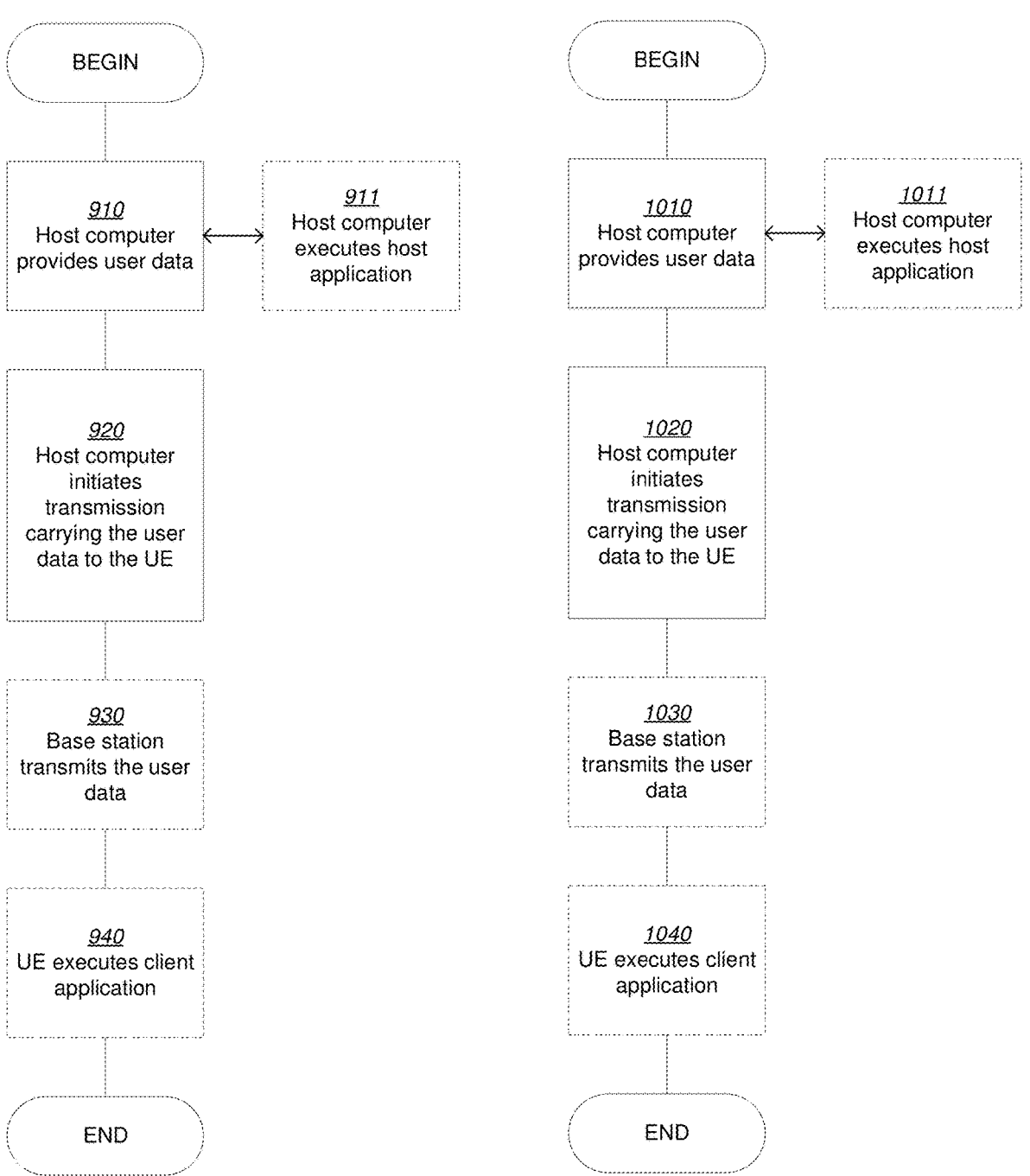
FIG. 9                    FIG. 10

BEAM REPORTING CONFIGURATION FOR SERVING FREQUENCY MEASUREMENTS

TECHNICAL AREA

The present disclosure is generally related to wireless communications systems, and is more particularly related to performing beam measurements in such systems.

BACKGROUND

It is widely accepted that New Radio (NR) will rely on beamforming to provide coverage, such as shown in FIG. 1. This means that NR is often referred to as a beam-based system. To find a good beam direction at a given transmission point (TRP)/access node/antenna array, a beam-sweep procedure is typically employed. For a typical beam-sweep procedure the node points a beam containing a synchronization signal and/or a beam identification signal, in each of several possible directions, one or more directions at a time. This is illustrated in FIG. 2, where each of the illustrated lobes represents a beam, and where the beams may be transmitted consecutively, in a sweeping fashion, or at the same time, or in some combination. If the same coverage properties apply to both a synchronization signal and a beam identification signal in each beam, the UE can not only synchronize to a TRP but also gain the best beam knowledge at a given location.

In NR, it has been agreed that the UE can be configured to report beam measurements for cells that have triggered a measurement report. In the NR specifications, the term BEAM is used to refer to a beamformed reference signal (RS), where the RS can either be a channel state information RS (CSI-RS) or a synchronization signal/public broadcast channel (SS/PBCH Block), or SSB. Then, a beam index may also be referred in the specifications as an RS index.

evaluation or measurement reporting. The UE determines which MO corresponds to each serving cell frequency from the frequencyInfoDL in ServingCellConfigCommon within the serving cell configuration. For inter-RAT E-UTRA measurements, a measurement object is a single E-UTRA carrier frequency. Associated with this E-UTRA carrier frequency, the network can also configure a list of cell specific offsets, a list of "blacklisted" cells and a list of "whitelisted" cells.

There may be a list of reporting configurations with one or multiple reporting configurations per measurement object. Each reporting configuration consists of a reporting criterion, an RS type or a reporting format. The reporting criterion is a criterion that triggers the UE to send a measurement report. This can either be periodical or a single event description. The RS type is the RS that the UE uses for beam and cell measurement results (SS/PBCH block or CSI-RS). As for the reporting format, the quantities per cell and/or per beam that the UE includes in the measurement report, such as a reference signal received power (RSRP), and other associated information, such as the maximum number of cells and the maximum number beams per cell to report.

There may be a list of measurement identities, where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

There are two parameters in reportConfigNR, defined in current RRC specifications, related to beam reporting, as shown in the following (ASN.1 section on reportConfigNR):

```
-- RS index reporting configuration
reportQuantityRsIndexes        MeasReportQuantity    OPTIONAL,-- Need M
maxNrofRSIndexesToReport                  INTEGER
(1..maxNrofIndexesToReport)                           OPTIONAL,-- Need M
includeBeamMeasurements                   BOOLEAN,
-- If configured the UE includes the best neighbour cells per serving frequency
```

According to TS 38.331 NR radio resource control (RRC) specifications, the network may configure the UE to report measurement information based on SS/PBCH blocks, such as measurement results per SS/PBCH block, measurement results per cell based on SS/PBCH blocks or SS/PBCH block indexes.

The network may configure the UE to report measurement information based on CSI-RS resources, including measurement results per CSI-RS resource, measurement results per cell based on CSI-RS resources, or CSI-RS resource measurement identifiers.

The measurement configuration includes parameters such as measurement objects (MOs), reporting configurations and/or measurement identities. An MO is a list of objects on which the UE shall perform the measurements. For intra-frequency and inter-frequency measurements, a measurement object is associated with an NR carrier frequency. Associated with this NR carrier frequency, the network may configure a list of cell specific offsets, a list of "blacklisted" cells and a list of "whitelisted" cells. Blacklisted cells are not applicable to event evaluation or measurement reporting. Whitelisted cells are the only ones applicable to event In version 15.0.0 of 3GPP TS 38.331, the field maxNrofRsIndexesToReport is defined as the maximum number of measurement information per RS index to include in the measurement report for A1-A6 events. The reportQuantityRsIndexes indicates which measurement information per RS index the UE shall include in the measurement report.

And, in the description of the UE behavior related to these parameters, especially related to measurements on serving frequencies, the following description is found in the RRC specification 38.331:

5.5.3 Performing measurements 5.5.3.1 General

. . .

The UE shall:

1> whenever the UE has a measConfig, perform RSRP and RSRQ measurements for each serving cell as follows:

2> if at least one measId included in the measIdList within VarMeasConfig contains an rsType set to ss:

3> if at least one measId included in the measIdList within VarMeasConfig contains a reportQuantityRsIndexes:

4> derive layer 3 filtered RSRP and RSRQ per beam for the serving cell based on SS/PBCH block, as described in 5.5.3.3;

3> derive serving cell measurement results based on SS/PBCH block, as described in 5.5.3.3;

2> if at least one measId included in the measIdList within VarMeasConfig contains an rsType set to csi-rs:

3> if at least one measId included in the measIdList within VarMeasConfig contains a reportQuantityRsIndexes:

4> derive layer 3 filtered RSRP and RSRQ per beam for the serving cell based on CSI-RS, as described in 5.5.3.3;

3> derive serving cell measurement results based on CSI-RS, as described in 5.5.3.3;

1> if at least one measId included in the measIdList within VarMeasConfig contains SINR as trigger quantity and/or reporting quantity:

2> if the associated reportConfig contains rsType set to ss:

3> if the measId contains a reportQuantityRsIndexes:

4> derive layer 3 filtered SINR per beam for the serving cell based on SS/PBCH block, as described in 5.5.3.3;

3> derive serving cell SINR based on SS/PBCH block, as described in 5.5.3.3;

2> if the associated reportConfig contains rsType set to csi-rs:

3> if the measId contains a reportQuantityRsIndexes:

4> derive layer 3 filtered SINR per beam for the serving cell based on CSI-RS, as described in 5.5.3.3;

3> derive serving cell SINR based on CSI-RS, as described in 5.5.3.3;

SUMMARY

Embodiments of the present invention involve techniques by which a wireless device (e.g., UE) can read one or a plurality of reporting parameters configured by the network and identify the number of beams to be measured per cell.

In a set of embodiments, these beam measurements are associated to serving frequencies. These can either be serving cells or best neighboring cells in serving frequencies.

In another set of embodiments, the number of beams is determined per RS type (SSB (CSI-RS) etc.) and per quantity to be measured and maintained by the UE (e.g. RSRP, reference signal received quality (RSRQ), signal to interference plus noise ratio (SINR), combinations of these, etc.). In this context, maintained refers to the fact that these beam measurements are L3 filtered and are meant to be included in measurement reports, when/if these reports are triggered.

By applying the methods disclosed in the embodiments, problems can be avoided. For example, the event that has triggered the measurement report indicated an X1 number of beams per cell to be reported. However, as there was no rule to define the maximum number of beam measurements for serving frequencies to maintain, the UE has decided to use an arbitrarily low value to reduce its measurement complexity. Hence, the UE cannot report the maximum value and the network may interpret that as the UE has not detected more than X1 beams for cells in serving frequencies. As handover decisions may depend on the number of beams per cell and their measurement information, handover performance can be negatively affected.

The event that has triggered the measurement report indicated an X2 number of beams to be reported. However, as there was no rule to define the maximum number of beam measurements for serving cells to maintain, the UE has decided to use an arbitrarily high value to make sure it could cope with the requirements on reporting. Hence, the UE will be able to report the indicated maximum value with no interpretation problems at the network but the cost would be higher than necessary for the UE.

The embodiments have the potential to improve handover performance and minimize the UE complexity (by avoiding increased complexity to unnecessary levels).

According to some embodiments, a method in a wireless device for performing beam measurements, includes receiving measurement reporting parameters configuring the wireless device for reporting measurements. The method includes determining, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell. The method further includes maintaining beam measurements for each of the one or more serving frequencies according to the corresponding determined number of beam measurements to be maintained, for reporting in a measurement report.

According to some embodiments, a wireless device configured to perform beam measurements includes transceiver circuitry and processing circuitry operatively associated with the transceiver circuitry. The processing circuitry is configured to receive measurement reporting parameters configuring the wireless device for reporting measurements and determine, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell. The processing circuitry is also configured to maintain beam measurements for each of the one or more serving frequencies according to the corresponding determined number of beam measurements to be maintained, for reporting in a measurement report.

According to some embodiments, a method in a wireless device for performing beam measurements, includes receiving measurement reporting parameters configuring the wireless device for reporting measurements and, for each of one or more frequencies, in response to determining that one of the measurement reporting parameters associated with the frequency indicates a maximum number of beam measurements to be reported per cell and another one of the measurement reporting parameters associated with the frequency indicates a quantity to be reported, maintaining at least one measurement per beam for one or more serving frequencies of a serving cell, for reporting in a measurement report.

According to some embodiments, a wireless device configured to perform beam measurements includes transceiver circuitry and processing circuitry operatively associated with the transceiver circuitry. The processing circuitry is configured to receive measurement reporting parameters configuring the wireless device for reporting measurements and, for each of one or more frequencies, in response to determining that one of the measurement reporting parameters associated with the frequency indicates a maximum number of beam measurements to be reported per cell and another one of the measurement reporting parameters associated with the frequency indicates a quantity to be reported, maintain at least one measurement per beam for one or more serving frequencies of a serving cell, for reporting in a measurement report.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 4 illustrates a method in the wireless device, according to some embodiments.

FIG. 5 illustrates another method in the wireless device, according to some embodiments.

FIGS. 9 to 12 are flowcharts illustrating example methods implemented in a communication system including a host computer, a base station and a user equipment.

DETAILED DESCRIPTION

Figure 1:
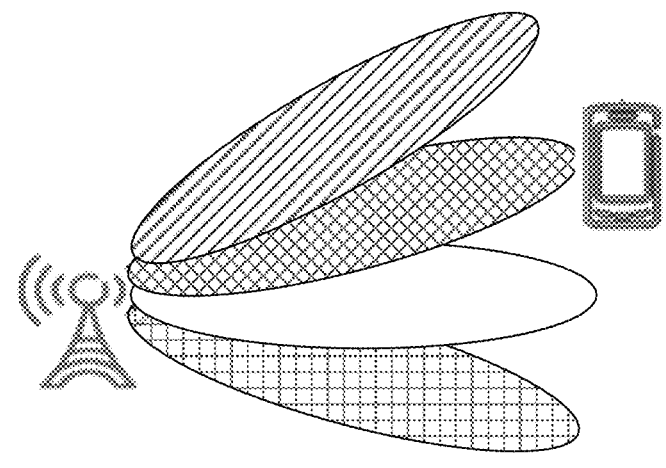
FIG. 1 illustrates beamforming.
Figure 2:
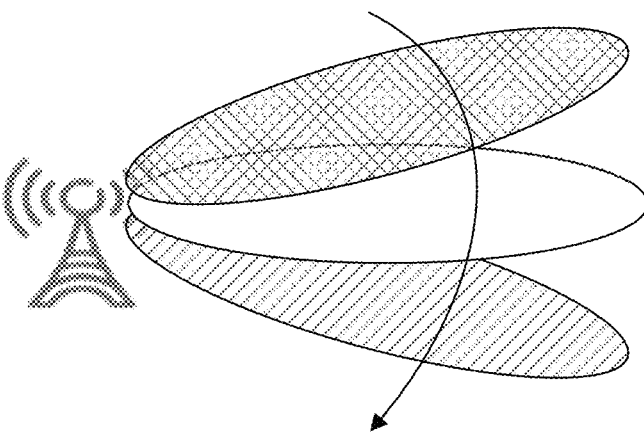
FIG. 2 illustrates a beam sweeping procedure.

In the following, concepts in accordance with exemplary embodiments of the invention will be explained in more detail and with reference to the accompanying drawings. The illustrated embodiments relate to radio link monitoring in such a wireless communication network, as performed by wireless devices, in the following also referred to as UEs, and access nodes. The wireless communication network may for example be based on a 5G radio access technology (RAT), such as an evolution of the LTE RAT or the 3GPP New Radio (NR). However, it is to be understood that the illustrated concepts could also be applied to other RATs.

There are two parameters controlling beam reporting, but not how the UE shall perform beam measurements. One parameter in version 15.0.0 of 3GPP TS 38.331 is maxNrofRsIndexesToReport, which was defined in this version of the standard as the maximum number of measurement information per RS index to include in the measurement report for A1-A6 events. Another parameter is reportQuantityRsIndexes, which indicates which measurement information per RS index the UE shall include in the measurement report. Version 15.0.0 of the specification defines these parameters as OPTIONAL and the procedural text does not define the UE behavior when these are not configured, which can be problematic in different ways.

A first problem is that in the specifications, beam measurements shall be L3 filtered and there is memory/complexity costs associated with that. The rule in version 15.0.0 of the specification states the following for SSB:

2> if at least one measId included in the measIdList within VarMeasConfig contains an rsType set to ss:

3> if at least one measId included in the measIdList within VarMeasConfig contains a reportQuantityRsIndexes:

4> derive layer 3 filtered RSRP and RSRQ per beam for the serving cell based on SS/PBCH block, as described in 5.5.3.3;

The specification does not specify how many beams for the serving cell on which the UE shall perform measurements and, consequently, the UE does not know how many L3 filtered beam measurements it needs to maintain or how many beam measurements for that RS type (SSB). The UE also does not know the quantities indicated in reportQuantityRsIndexes on which the UE needs to perform measurements to have beam measurements available when a measurement report is triggered. Hence, considering that the existing rules for reporting of beam information for serving cells also uses these parameters, as shown in their field description, performance problems can occur and costs can be higher than necessary for the UE.

Embodiments of the present invention enable a UE to read one or a plurality of reporting parameters configured by the network and identifying a number of beams to be measured per cell (for particular types of cells). In a set of embodiments, these beam measurements are associated with cells on serving frequencies. These can either be serving cells or best neighboring cells in serving frequencies. In another set of embodiments, the reporting parameters configured by the network may additionally indicate the number of beams per RS type and per quantity to be measured and maintained by the UE. In this context, maintained refers to the fact that these beam measurements are L3 filtered and are meant to be included in measurement reports, when/if these reports are triggered.

In the next embodiments, beam measurement may refer to: i) RSRP, ii) RSRQ, iii) SINR, iii) both RSRP and RSRQ, iv) both RSRP and SINR, v) both RSRQ and SINR, vi) RSRP, RSRQ and SINR.

In the next embodiments, RS type can be a least: i) SSB, ii) CSI-RS, iii) both SSB and CSI-RS.

In a first embodiment, the UE only performs beam measurements (e.g., for cells on serving frequencies) if a second parameter defining the maximum number of beams to be reported per cell is configured. In versions of NR specifications later than 38.331 version 15.0.0, this can be called maxNrofRsIndexesToReport. Note that this will be a different definition for maxNrofRsIndexesToReport than was used in version 15.0.0. If the only parameter indicating the quantities to be reported is configured (reportQuantityRsIndexes), the UE does not perform beam measurements. In other words, both must be configured to indicate to the UE performs beam measurements.

In one example, the UE performs beam measurements for serving frequencies if at least one of measurement identifier that has been configured to that UE is associated with a reportConfig that has both parameters present (i.e., configured): i) maximum number of beam to be reported per cell (e.g., maxNrofRsIndexesToReport field, as defined in later NR specifications) and ii) quantities to be reported (e.g., reportQuantityRsIndexes field, as defined in NR specifications). That first example is suitable for the case both parameters are defined as OPTIONAL in the RRC signalling, which is the case in current NR specifications, and in the case maxNrofRsIndexesToReport is defined with a value starting from 1.

In this embodiment, the rule can be applied per RS type. In other words, each reportConfig is associated to an RS type which can either be SSB or CSI-RS.

The UE can apply the previous rule in this first example for SSB beam measurements, if at least one measurement identifier that has been configured to that UE is associated with a reportConfig that has RS type as SSB and both parameters present (i.e., configured): i) maximum number of beam to be reported per cell (e.g., maxNrofRsIndexesTo-Report field, as defined in later NR specifications) and ii) quantities to be reported (e.g., reportQuantityRsIndexes field, as defined in NR specifications).

The UE applies the previous rule in the first example of this embodiment for CSI-RS beam measurements, if at least one measurement identifier that has been configured to that UE is associated with a reportConfig that has RS type as CSI-RS and both parameters present (i.e., configured): i) maximum number of beam to be reported per cell (e.g., maxNrofRsIndexesToReport field, as defined in later NR specifications) and ii) quantities to be reported (e.g., reportQuantityRsIndexes field, as defined in NR specifications).

In a second embodiment, there can be a quantity that is not always measured for beam measurements. For example, if the rule of first embodiment is fulfilled, the UE always performs RSRP and RSRQ beam measurements for serving frequencies (i.e., serving cells and/or best neighboring cells on serving frequencies), but an additional rule applies for SINR beam measurements. So, the UE performs SINR beam measurements for serving frequencies if both parameters are configured for at least one measurement identifier (maximum number of beam to be reported per cell (e.g., maxN-rofRsIndexesToReport field), and quantities to be reported (e.g., reportQuantityRsIndexes field, as defined in later NR specifications) and, that same measurement identifier also has SINR a trigger quantity or measurement quantity. This proposed rule can also apply to any additional quantity that is also configurable and is added later in the specifications, e.g., a received signal strength indicator (RSSI).

A change in the RRC specification can be implemented as follows:

The UE shall:
1> whenever the UE has a measConfig, perform RSRP and RSRQ measurements for each serving cell as follows:
  2> if at least one measId included in the measIdList within VarMeasConfig contains an rsType set to ssb:
    3> if at least one measId included in the measIdList within VarMeasConfig contains a reportQuantityRsIndexes and maxNrofRsIndexesToReport:
      4> derive layer 3 filtered RSRP and RSRQ per beam for the serving cell based on SS/PBCH block, as described in 5.5.3.3a;
    3> derive serving cell measurement results based on SS/PBCH block, as described in 5.5.3.3;
  2> if at least one measId included in the measIdList within VarMeasConfig contains an rsType set to csi-rs:

3> if at least one measId included in the measIdList within VarMeasConfig contains a reportQuantityRsIndexes and maxNrofRsIndexesToReport:
      4> derive layer 3 filtered RSRP and RSRQ per beam for the serving cell based on CSI-RS, as described in 5.5.3.3a;
    3> derive serving cell measurement results based on CSI-RS, as described in 5.5.3.3;
1> if at least one measId included in the measIdList within VarMeasConfig contains SINR as trigger quantity and/or reporting quantity:
  2> if the associated reportConfig contains rsType set to ssb:
    3> if the measId contains a reportQuantityRsIndexes and maxNrofRsIndexesToReport:
      4> derive layer 3 filtered SINR per beam for the serving cell based on SS/PBCH block, as described in 5.5.3.3a;
    3> derive serving cell SINR based on SS/PBCH block, as described in 5.5.3.3;
  2> if the associated reportConfig contains rsType set to csi-rs:
    3> if the measId contains a reportQuantityRsIndexes and maxNrofRsIndexesToReport:
      4> derive layer 3 filtered SINR per beam for the serving cell based on CSI-RS, as described in 5.5.3.3a;
    3> derive serving cell SINR based on CSI-RS, as described in 5.5.3.3;

In yet another variant of the second embodiment, the parameter determining the maximum number of beams to report per cell (e.g., maxNrofRsIndexesToReport) could be set to ZERO by the network. In that sense, even if the parameter is configured, it is not certain that the UE shall perform beam measurements. Hence, an additional rule for that case is that maxNrofRsIndexesToReport is configured and is not set to 0 (zero). The specification text could be modified as follows to implement that variant:

The UE shall:
1> whenever the UE has a measConfig, perform RSRP and RSRQ measurements for each serving cell as follows:
  2> if at least one measId included in the measIdList within VarMeasConfig contains an rsType set to ssb:
    3> if at least one measId included in the measIdList within VarMeasConfig contains a reportQuantityRsIndexes and maxNrofRsIndexesToReport set to higher than 0:
      4> derive layer 3 filtered RSRP and RSRQ per beam for the serving cell based on SS/PBCH block, as described in 5.5.3.3a;
    3> derive serving cell measurement results based on SS/PBCH block, as described in 5.5.3.3;
  2> if at least one measId included in the measIdList within VarMeasConfig contains an rsType set to csi-rs:
    3> if at least one measId included in the measIdList within VarMeasConfig contains a reportQuantityRsIndexes and maxNrofRsIndexesToReport set to higher than 0:
      4> derive layer 3 filtered RSRP and RSRQ per beam for the serving cell based on CSI-RS, as described in 5.5.3.3a;
    3> derive serving cell measurement results based on CSI-RS, as described in 5.5.3.3;

1> if at least one measId included in the measIdList within VarMeasConfig contains SINR as trigger quantity and/or reporting quantity:

2> if the associated reportConfig contains rsType set to ssb:

3> if the measId contains a reportQuantityRsIndexes and maxNrofRsIndexesToReport set to higher than 0:

4> derive layer 3 filtered SINR per beam for the serving cell based on SS/PBCH block, as described in 5.5.3.3a;

3> derive serving cell SINR based on SS/PBCH block, as described in 5.5.3.3;

2> if the associated reportConfig contains rsType set to csi-rs:

3> if the measId contains a reportQuantityRsIndexes and maxNrofRsIndexesToReport set to higher than 0:

4> derive layer 3 filtered SINR per beam for the serving cell based on CSI-RS, as described in 5.5.3.3a;

3> derive serving cell SINR based on CSI-RS, as described in 5.5.3.3;

In a third embodiment, the UE derives the exact number of beams to be measured and maintained (in L3 filtered measurements) for beam measurements on serving frequency. This can be done based on the reporting configuration parameters provided by the network. For a given RS type, the UE determines the number of beams to maintain for a given quantity or quantities. The number of beams to maintain and measure for serving frequencies, per cell, per RS type, is defined as follows Number of beams to maintain L3 beam measurements=maximum {maxNrofRsIndexesToReport(1), maxNrofRsIndexesToReport(2), . . . , maxNrofRsIndexesToReport(Y)}

In this example, Y is the total number of measurement identifiers that the UE currently has after being configured. For example, the UE may currently have the configuration shown in Table 1.

TABLE 1

| Meas ID | maxNrofRsIndexes ToReport in associated reportConfig | RS type in associated reportConfig | Is SINR configured as report quantity, beam report quantity or trigger quantity? |
|---|---|---|---|
| 1 | 5 | SSB | Yes |
| 2 | 10 | SSB | No |
| 3 | 2 | SSB | Yes |
| 4 | 15 | CSI-RS | No |
| 5 | 15 | CSI-RS | Yes |

In this example, Y=3 for SSB and Y=2 for CSI-RS. Hence, for SSB, the number of beams to maintain={maxNrofRsIndexesToReport(1), maxNrofRsIndexesToReport(2), maxNrofRsIndexesToReport(3)} in associated reportConfig=max {5, 10, 2}=10. Hence, if the event that triggers the measurement report is the one associated to measId=1, with 5, the UE will have maintained 10 beams, and it can report the strongest 5 (or the 5 according to the reporting rule). In this example, for CSI-RS, the number of beams to maintain={maxNrofRsIndexesToReport(4), maxNrofRsIndexesToReport(5)} in associated reportConfig=max {15, 15}=15.

Still in this example, the quantities to keep these measurements for each RS type can be RSRP and RSRQ at least. Then, a third column indicates which of these measurement identifiers have SINR configured and which measurement identifiers do not have. In the SSB case, measId=1 and measId=3 have SINR configured. Hence, according to the proposed method, the UE maintains and measures SINR for 5 beams at most. That is because if measId=2 is triggered, the UE does not have to report SINR beam measurements, only RSRP and RSRQ. Hence, the rule for the maximum values can be defined in general terms per RS type and per configurable quantity, where in NR, the only configurable quantity is the SINR (RSRQ and RSQ always reported).

Hence, the previous rule can be defined for configurable quantities as follows, e.g., in the case of SINR beam measurements:

Number of beams to maintain L3 beam measurements per configurable quantity (e.g., SINR)=maximum {maxNrofRsIndexesToReport(1), maxNrofRsIndexesToReport(2), . . . , maxNrofRsIndexesToReport(Y)}, where the value is included only if SINR is configured for the associated measurement identifier.

In a fourth embodiment, the UE derives the exact number of beams to be measured and maintained (in L3 filtered measurements) for beam measurements on non-serving frequencies. Notice that similar rules as described in the previous embodiments and examples could also be applicable for cells on non-serving frequencies.

The following configuration to the UE is assumed, as previously described, but now indicating the exact event A3 that is configured. This is shown in Table 2.

TABLE 2

| Meas ID | maxNrofRsIndexes ToReport in associated reportConfig | RS type in associated reportConfig | Is SINR configured as report quantity, beam report quantity or trigger quantity? | Event |
|---|---|---|---|---|
| 1 | 5 | SSB | Yes | A3 |
| 2 | 10 | SSB | No | A3 |
| 3 | 2 | SSB | Yes | A3 |
| 4 | 15 | CSI-RS | No | A3 |
| 5 | 15 | CSI-RS | Yes | A3 |

If rules from previous embodiments are applied, the UE maintains the following L3 beam measurements for each serving frequency: RSRP and RSRQ L3 beam filtered measurements per serving cell based on SSB for 10 beams; and SINR L3 beam filtered measurements per serving cell based on SSB for 5 beams. If reporting of best neighbors on serving frequencies is configured for the associated measurement identifier, RSRP and RSRQ L3 beam filtered measurements are maintained per serving cell based on SSB for 10 beams. If reporting of best neighbors on serving frequencies is configured, for the associated measurement identifier, SINR L3 beam filtered measurements are maintained per serving cell based on SSB for 5 beams. RSRP and RSRQ L3 beam filtered measurements are maintained per serving cell based on CSI-RS for 15 beams. SINR L3 beam filtered measurements are maintained per serving cell based on CSI-RS for 15 beams. If reporting of best neighbors on serving frequencies is configured for the associated measurement identifier, RSRP and RSRQ L3 beam filtered measurements are maintained per serving cell based on CSI-RS for 15 beams. If reporting of best neighbors on serving frequencies is configured for the associated measurement identifier, SINR L3 beam filtered measurements are maintained per serving cell based on CSI-RS for 15 beams.

For cells on non-serving frequencies, where each non-serving frequency is associated with a measurement object {MO(1), MO(2), . . . , MO(k)}. And, each measId is associated with a reportConfig and a measObject. Then, to determine whether the UE performs beam measurements for a given RS type and quantity, and the exact number of L3 filtered beam measurements to maintain per quantity and per RS type the UE performs the following rule. If maxNrof-RsIndexesToReport and reportQuantityRsIndexes are configured in the reporting configuration for at least one measurement identifier with a measObject associated with a non-serving frequency, the UE performs beam measurements for cells in that non-serving frequency. The maximum number of beams per cell in that frequency is determined by the maximum value of the configured values for the parameter maxNrofRsIndexesToReport configured in each associated reportConfig/measurement ID for that particular RS type and quantities to be reported. In other words, the rule for cells in non-serving frequencies is applied per quantity and per RS type.

In another example, the beams for cells in non-serving frequencies are now determined. In this example, Y is the total number of measurement identifiers that the UE currently has after being configured. For example, if the UE has currently the configuration shown in Table 3.

TABLE 3

| Meas ID | maxNrofRs IndexesToReport in associated reportConfig | RS type in associated reportConfig | Is RSRP configured as report quantity, beam report quantity or trigger quantity? | Is RSRQ configured as report quantity, beam report quantity or trigger quantity? | Is SINR configured as report quantity, beam report quantity or trigger quantity? |
|---|---|---|---|---|---|
| 1 | 5 | SSB | Yes | Yes | No |
| 2 | 10 | SSB | No | Yes | No |
| 3 | 2 | SSB | Yes | Yes | Yes |
| 4 | 5 | CSI-RS | No | Yes | Yes |
| 5 | 2 | CSI-RS | Yes | Yes | No |

In this example, Y=3 for SSB and Y=2 for CSI-RS. Then, for that particular frequency, the following rule applies. For SSB, the number of beams to maintain for RSRP measurements={maxNrofRsIndexesToReport(1), maxNrof-RsIndexesToReport(3)} in associated reportConfig=max {5, 2}=5. For SSB, the number of beams to maintain for RSRQ measurements={maxNrofRsIndexesToReport(1), maxNrof-RsIndexesToReport(2), maxNrofRsIndexesToReport(3)} in associated reportConfig=max {5, 10, 2}=10. For SSB, the number of beams to maintain for SINR measurements={maxNrofRsIndexesToReport(3)} in associated reportConfig=max {2}=2. For CSI-RS, the number of beams to maintain for RSRP measurements={maxNrofRsIndexesToReport(5)} in associated reportConfig=max {2}=2. For CSI-RS, the number of beams to maintain for RSRQ measurements={maxNrofRsIndexesToReport(4), maxNrof-RsIndexesToReport(5)} in associated reportConfig=max {5, 2}=5. For CSI-RS, the number of beams to maintain for SINR measurements={maxNrofRsIndexesToReport(4)} in associated reportConfig=max {5}=5.

The following are additional embodiments that enable the UE to determine how many beams to measure and maintain L3 filtered measurements per RS type (SSB and CSI-RS)

and per measurement quantity (RSRP (RSRQ) SINR, etc.). This may be done based on a rule using existing parameters defined for reporting purposes.

Figure 3:
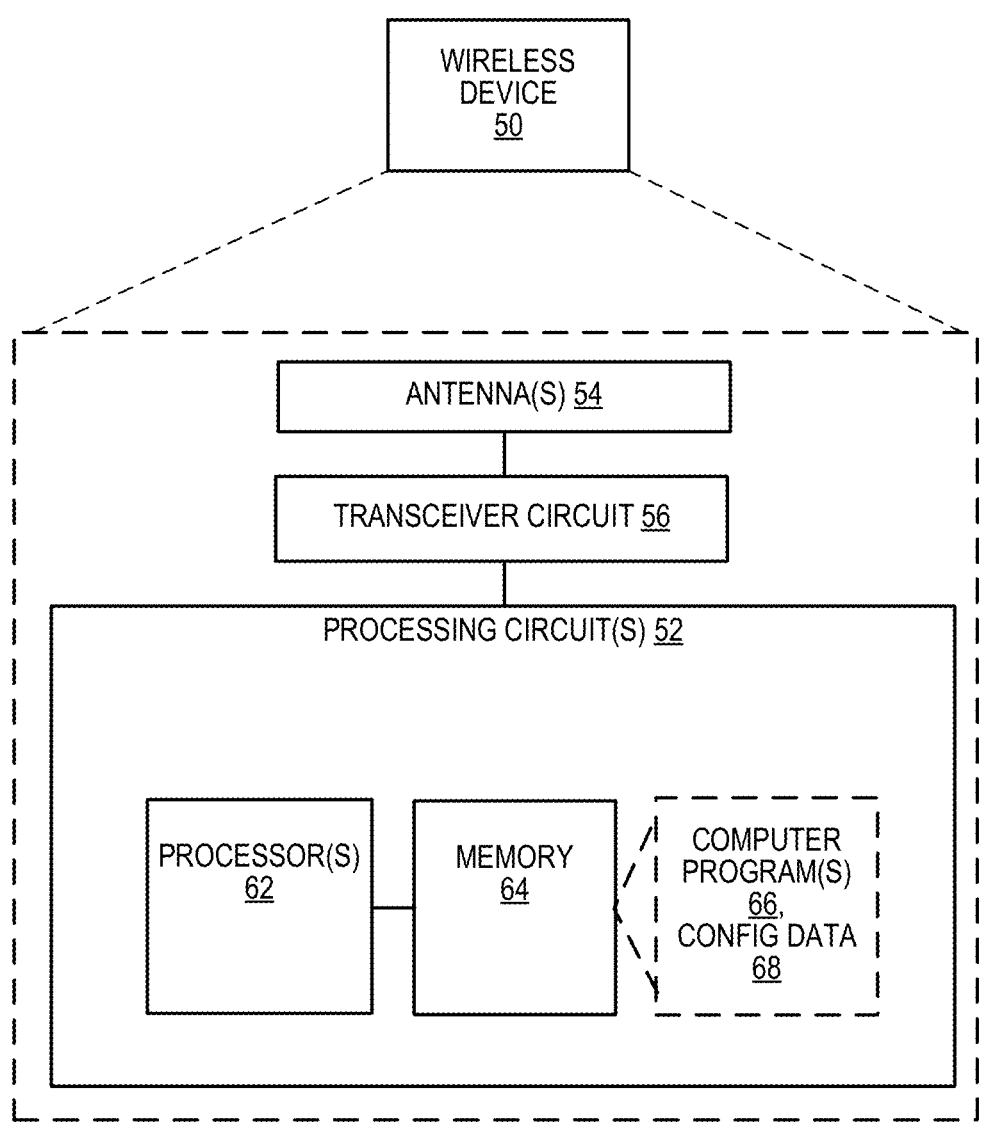
FIG. 3 illustrates a block diagram of a wireless device, according to some embodiments.

Accordingly, FIG. 3 illustrates a diagram of a wireless device that performs such techniques, shown as wireless device 50. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio node or base station in a wide-area cellular network via antennas 54 and a transceiver circuit 56. The transceiver circuit 56 may include transmitter circuits, receiver circuits, and associated control circuits that are collectively configured to transmit and receive signals according to a radio access technology, for the purposes of using cellular communication services. This radio access technology is NR for the purposes of this discussion.

The wireless device 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50. The processing circuit 52 may be configured, e.g., through the use of appropriate program code stored in memory 64, to carry out one or more of the methods and/or signaling processes detailed hereinafter.

The wireless device 50 is configured, according to some embodiments, to perform beam measurements. Accordingly, the processing circuit 52 is configured to receive measurement reporting parameters configuring the wireless device for reporting measurements and determine, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell. The processing circuitry 52 is also configured to maintain beam measurements for each of the one or more serving frequencies according to the corresponding determined number of beam measurements to be maintained, for reporting in a measurement report.

According to some embodiments, the processing circuit 52 is configured to perform a method 400, shown in FIG. 4, that includes receiving measurement reporting parameters configuring the wireless device for reporting measurements (block 402). The method 400 includes determining, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell (block 404). The method 400 further includes maintaining beam measurements for each of the one or more serving frequencies according to the corresponding determined number of beam measurements to be maintained, for reporting in a measurement report (block 406).

The method 400 may include reporting, in a measurement report, some or all of the maintained beam measurements for the at least one serving frequency, in response to a trigger corresponding to the reported measurements. A number of maintained beam measurements that are reported in response to the trigger may be determined based on the trigger.

The determining may include, for at least a first one of the one or more serving frequencies, determining that no beam measurements are to be maintained, in response to determining that no parameter indicating a maximum number of beams to be reported per cell has been configured for the at least the first one of one or more serving frequencies.

The determining may include, for at least a first one of the one or more serving frequencies, determining that at least one beam measurement is to be maintained, in response to determining that a parameter indicating a maximum number of beams to be reported per cell has been configured with a non-zero value for the at least the first one of the one or more serving frequencies.

The determining may include, for at least a first one of the one or more serving frequencies, determining that at least one beam measurement is to be maintained, in response to determining that a parameter indicating a maximum number of beams to be reported per cell and a parameter indicating a quantity to be reported have been configured for the at least the first one of one or more serving frequencies.

The at least one beam measurement to be maintained for the first one of the one or more serving frequencies may include a RSRP measurement and a RSRQ measurement. The method 400 may further include maintaining a SINR beam measurement for the first one of the one or more serving frequencies in response to determining that a SINR trigger is configured for the first one of the one or more serving frequencies.

The determining of a number of beam measurements to be maintained may be performed separately for each of two or more reference signal types. The two or more reference signal types may include a CSI-RS type and a SSB type.

In some embodiments, the wireless device has received multiple measurement configurations associated with a first one of the one or more serving frequencies, each of the multiple measurement configurations comprising a respective maximum number of beam measurements to report parameter. In these embodiments, the method 400 may further include, for the first one of the one or more serving frequencies and a first one of the two or more reference signal types, determining the number of beam measurements to be maintained by determining a first maximum value among the parameters indicating the maximum number of beam measurements to report for those measurement configurations associated with the first one of the two or more reference signal types. The method 400 may further include maintaining, for the first one of the one or more serving frequencies and the first one of the two or more reference signal types, a number of RSRP measurements equal to the first maximum value and a number of RSRQ measurements equal to the first maximum value. The method 400 may also include, for the first one of the one or more serving frequencies and the first one of the two or more reference signal types, determining a number of SINR beam measurements to be maintained by determining a second maximum value among the maximum number of beam measurements to report parameters for those measurement configurations associated with the first one of the two or more reference signal types and including an SINR trigger.

The method 400 may include, for each of one or more non-serving frequencies and for each of one or more reference signal types, determining a number of beam measurements to be maintained, by determining a maximum value among parameters indicating the maximum number of beam measurements to report for measurement configurations corresponding to the respective non-serving frequency and configuring measurement reporting for the respective reference signal type.

According to some embodiments, the processing circuit 52 is configured to receive measurement reporting parameters configuring the wireless device for reporting measurements and, in response to determining that one of the measurement reporting parameters indicates a maximum number of beam measurements to be reported per cell and another one of the measurement reporting parameters indicates a quantity to be reported, maintain at least one measurement per beam for one or more serving frequencies of a serving cell, for reporting in a measurement report.

According to some embodiments, the processing circuit 52 is configured to perform a method 500, shown in FIG. 5, that includes receiving measurement reporting parameters configuring the wireless device for reporting measurements (block 502) and, in response to determining that one of the measurement reporting parameters indicates a maximum number of beam measurements to be reported per cell and another one of the measurement reporting parameters indicates a quantity to be reported, maintaining at least one measurement per beam for one or more serving frequencies of a serving cell, for reporting in a measurement report (block 504).

The at least one beam measurement to be maintained may include an RSRP measurement and an RSRQ measurement. The determining may be performed separately for each of two or more reference signal types, which may include a CSI-RS type and a SSB type.

Figure 6:
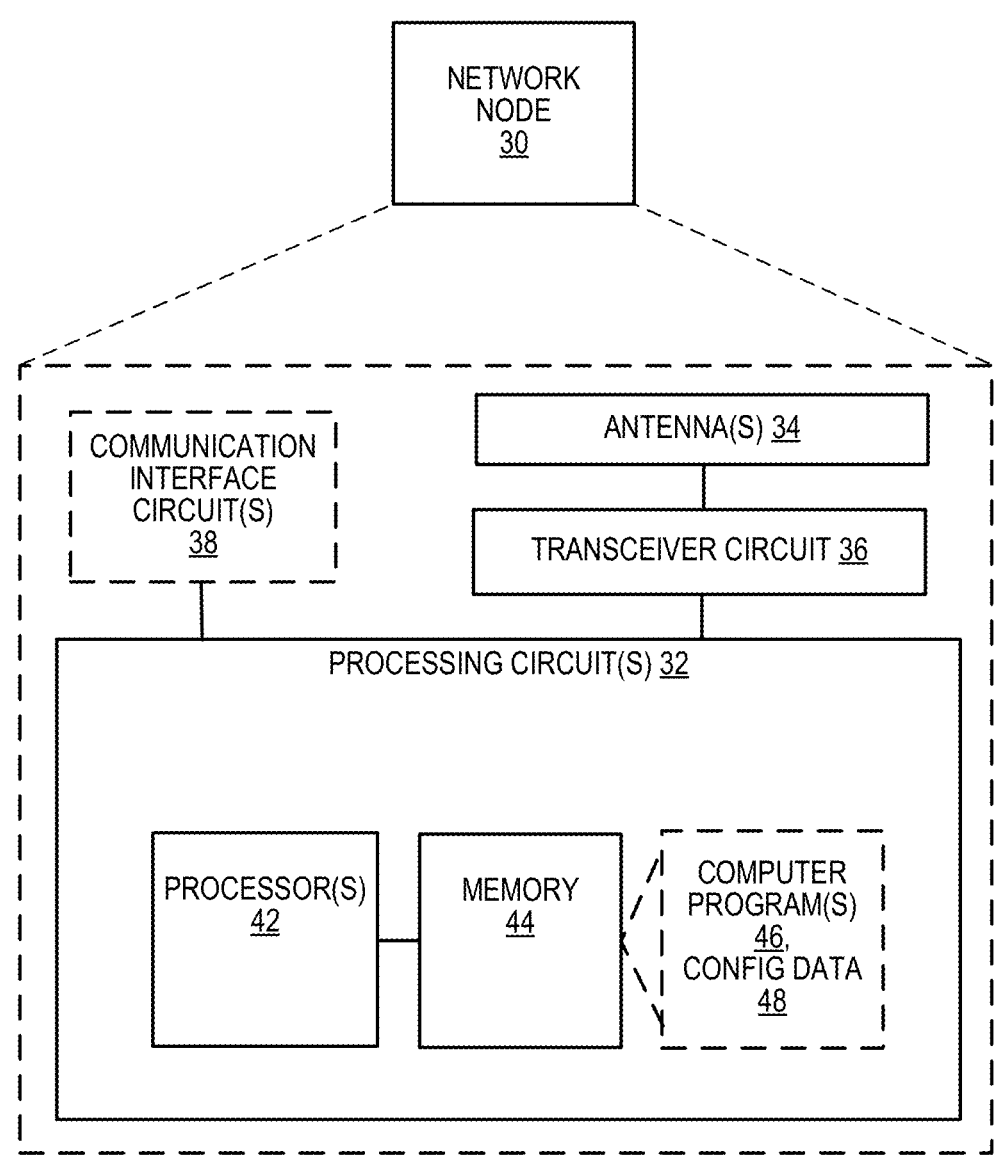
FIG. 6 illustrates a block diagram of a network node, according to some embodiments.

FIG. 6 illustrates a diagram of a corresponding network node 30 that may be configured to carry out one or more of techniques that complement or support the wireless device with the techniques described above. The network node 30 can be any kind of network node that may include a network access node such as a base station, radio base station, base transceiver station, evolved Node B (eNodeB), Node B, or relay node. In the non-limiting embodiments described below, the network node 30 will be described as being configured to operate as a cellular network access node in an NR network.

Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 may include a communication interface circuit 38 that includes circuitry for communicating with other nodes in the core network, radio nodes, and/or other types of nodes in the network for the purposes of providing data and/or cellular communication services. The network node 30 communicates with UEs using antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the transceiver circuit 36 and, in some cases, the communication interface circuit 38. For ease of discussion, the one or more processing circuits 32 are referred to hereafter as "the processing circuit 32" or "the processing circuitry 32." The processing circuit 32 comprises one or more digital processors 42, e.g., one or more microprocessors, microcontrollers, DSPs, FPGAs, CPLDs, ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the network access node 30. The processing circuit 32 may be configured, e.g., through the use of appropriate program code stored in memory 44, to carry out one or more of the methods and/or signaling processes detailed hereinafter.

The network node 30 is configured, according to some embodiments, to operate in support of the wireless device techniques described above.

In some embodiments, for example, different RSs are transmitted in each beam, and each one carries its own beam identifier (BID). In this case, the reference signals can be called beam-specific RS (BRS), and the UE can perform RLM on a per-beam basis, i.e., measuring an RSRP per individual beam that is equivalent to the quality of the transmission of the downlink control channel in that specific beam. In other embodiments, the same RSs may be transmitted in each of the beams, where each one carries the same identifier. This identifier can either be a BID, a group identifier that can be a cell identifier Cell ID (CID) or both a beam ID+cell ID. In these embodiments, the UE may distinguish beams in the time domain, and/or simply perform some averaging over beams carrying the same identifier.

RSs may carry a BID, a beam ID plus a group ID (which may be understood as a cell ID, for example), or simply a group ID, in various embodiments. A downlink control channel, e.g., a PDCCH, is transmitted using the same beamforming properties as the RSs that are used for mobility purposes. This may be understood as transmitting the downlink control channel in the "same beam" as the RSs, even if transmitted at different times. Note that the downlink control channel can carry (or be associated with) different RSs for channel estimation and channel decoding purposes. These can be, but are not necessarily, completely separate from the ones used for mobility, and may be cell-specific, UE-specific, and/or beam-specific, in various embodiments.

Figure 7:
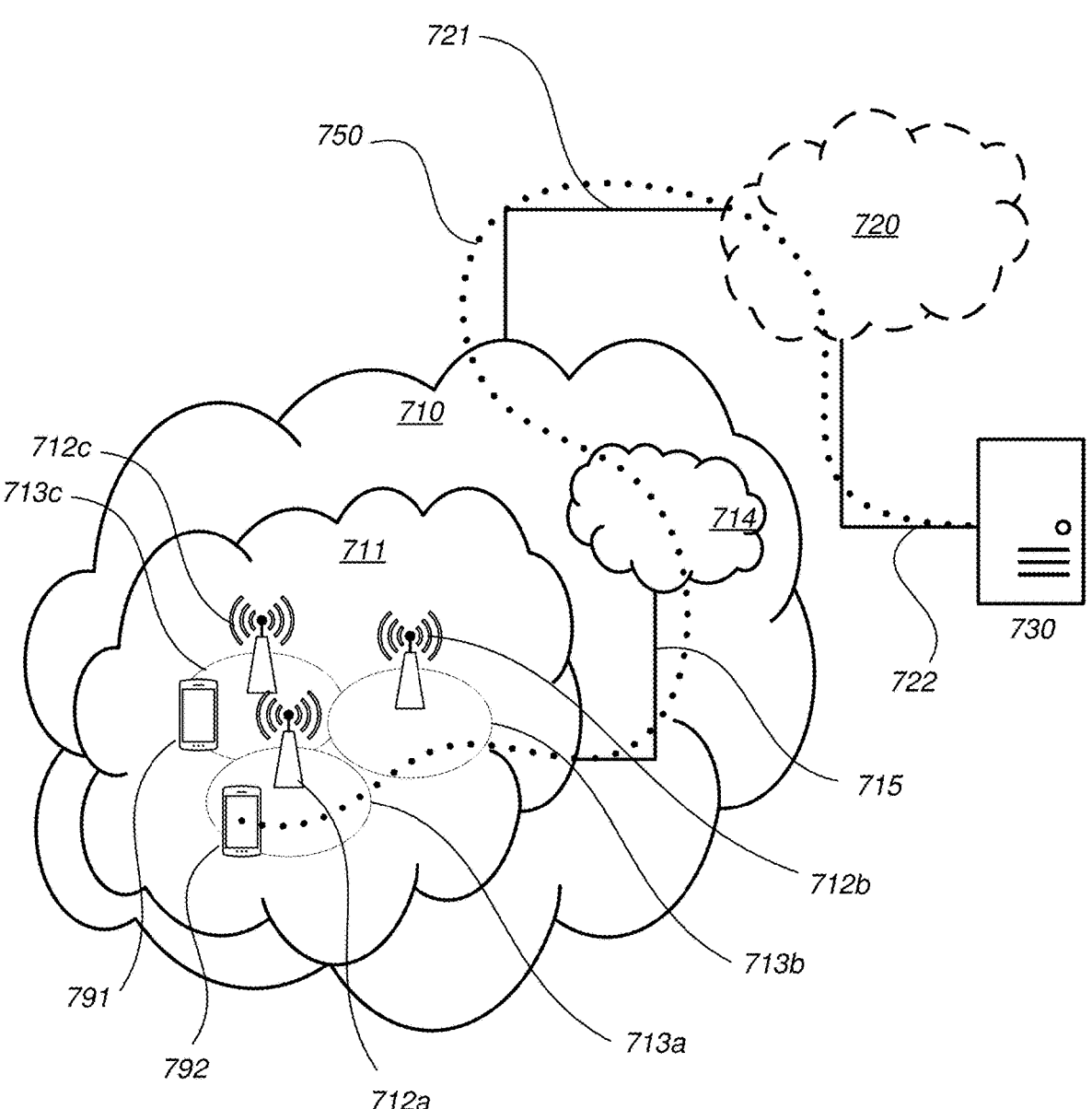
FIG. 7 schematically illustrates a telecommunication network connected via an intermediate network to a host computer, according to some embodiments.

FIG. 7, according to some embodiments, illustrates a communication system that includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 880 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
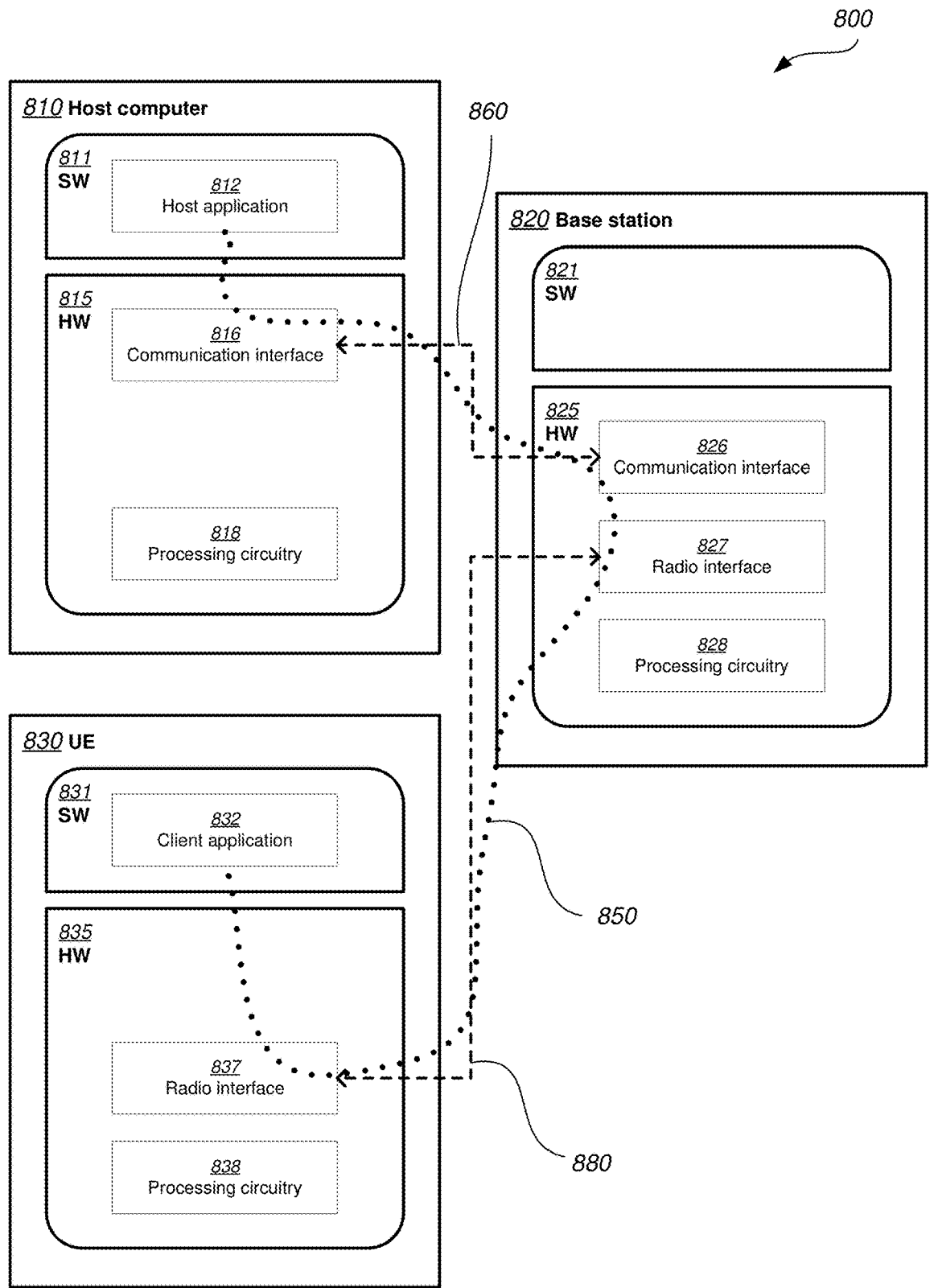
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 630, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure, such as provided by wireless device 50, along with the corresponding method 400. There is no rule to define the maximum number of beam measurements for serving frequencies to maintain, so the UE 830 will decide to use an arbitrarily low value to reduce its measurement complexity. Hence, the UE 830 cannot report the maximum value and the network may interpret that as the UE 830 has not detected more than X1 beams for cells in serving frequencies. As handover decisions may depend on number of beams per cell and their measurement information, handover performance can be negatively affected. There also is no rule to define the maximum number of beam measurements for serving cells to maintain. The UE 830 may decide to use an arbitrarily high value to make sure it could cope with the requirements on reporting. Hence, the UE 830 will be able to report the indicated maximum value with no interpretation problems at the network but the cost would be higher than necessary for the UE. The embodiments have the potential to improve handover performance and minimize the UE complexity (by avoiding increased complexity to unnecessary levels). This improves the data rate, capacity, latency and/or power consumption for the network and UE 830 using the OTT connection 850 and thereby provide benefits such as reduced user waiting time, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figures 11, 12:
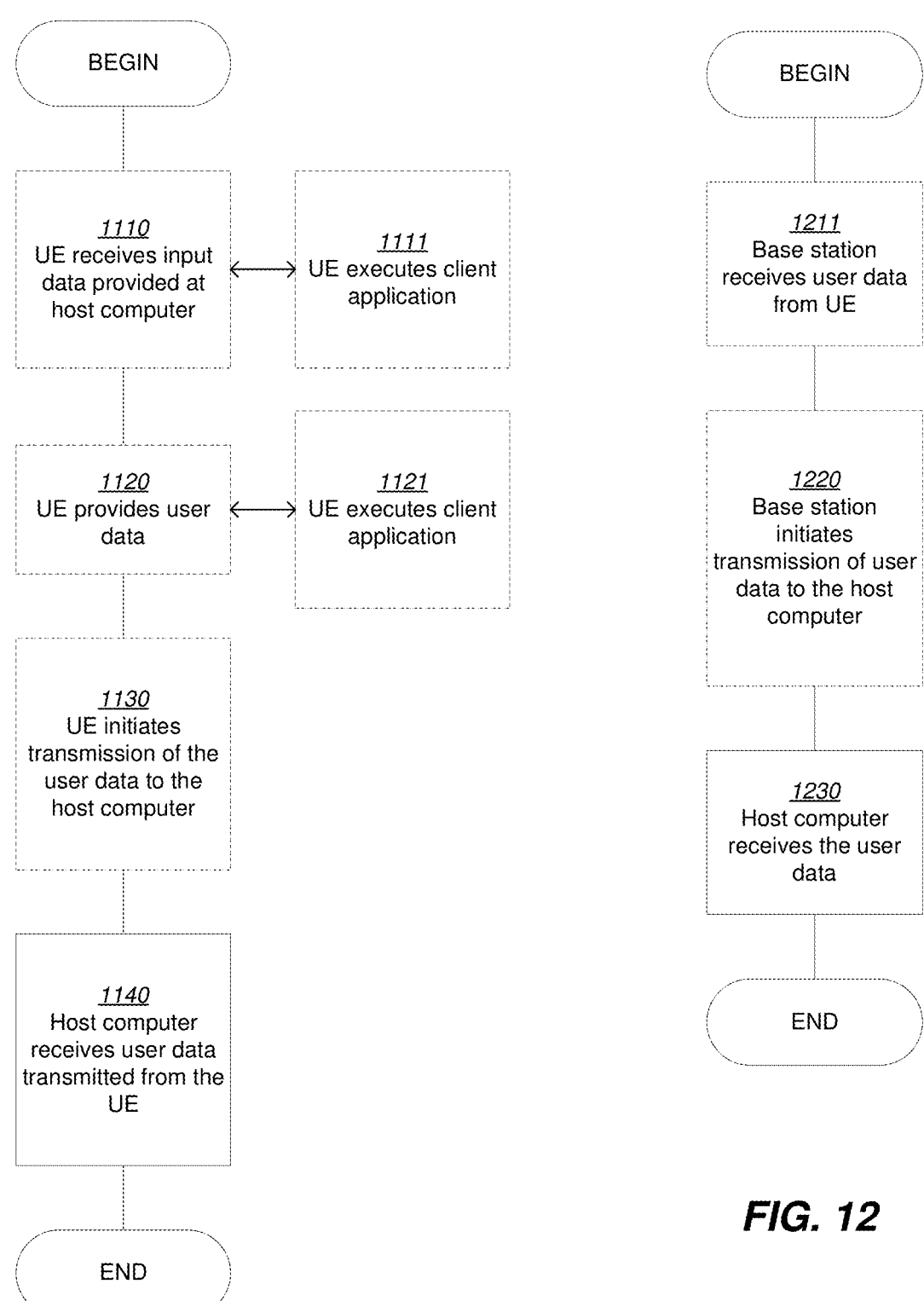

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally, or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

According to some embodiments, a communication system including a host computer comprises processing circuitry configured to provide user data and a communication interface configured to forward user data to a cellular network for transmission to a UE configured to perform beam measurements, where the UE comprises a radio interface and processing circuitry configured to receive measurement reporting parameters configuring the UE for reporting measurements and determine, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell. The UE's processing circuitry is also configured to maintain beam measurements for each of the one or more serving frequencies according to the corresponding determined number of beam measurements to be maintained, for reporting in a measurement report. The communication system may further include the UE and/or a base station configured to communicate with the UE. The processing circuitry of the host computer may be configured to execute a host application, thereby providing the user data, and the UE's processing circuitry may be configured to execute a client application associated with the host application.

According to some embodiments, a method implemented in a communication system including a host computer, a base station and a UE configured to perform beam measurements, the method comprising, at the host computer, providing user data and initiating a transmission carrying the user data to the UE via a cellular network comprising the base station. The method at the UE comprises receiving measurement reporting parameters configuring the UE for reporting measurements and determining, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell. The method at the UE also includes maintaining beam measurements for each of the one or more serving frequencies according to the corresponding determined number of beam measurements to be maintained, for reporting in a measurement report. The method at the UE may further include receiving the user data from the base station.

According to some embodiments, a communication system including a host computer comprises a communication interface configured to receive user data originating from a transmission from a UE to a base station, the UE is configured to perform beam measurements, and UE's processing circuitry configured to receive measurement reporting parameters configuring the UE for reporting measurements and determine, for each of one or more serving frequencies corresponding to a serving cell or a neighboring cell in the serving frequency, a number of beam measurements to be maintained, wherein said determining is based on one or more measurement reporting parameters indicating a maximum number of beams to be reported per cell. The UE's processing circuitry is also configured to maintain beam measurements for each of the one or more serving frequencies according to the corresponding determined number of beam measurements to be maintained, for reporting in a measurement report. The communication system may further include the UE and/or the base station, where the base station comprises a radio interface configured to communicate with the UE and a communication interface configured to forward to the host computer the user data carried by a transmission from the UE to the base station. The processing circuitry of the host computer may be configured to execute a host application, and the UE's processing circuitry may be configured to execute a client application associated with the host application, thereby providing the user data. The processing circuitry of the host computer may be configured to execute a host application, thereby providing request data, and the UE's processing circuitry may be configured to execute a client application associated with the host application, thereby providing the user data in response to the request data.

According to some embodiments, a method implemented in a UE configured to perform beam measurements, the method comprises receiving measurement reporting parameters configuring the UE for reporting measurements and determining, for each of one or more serving frequencies corresponding to a serving cell or a neighboring cell in the serving frequency, a number of beam measurements to be maintained, wherein said determining is based on one or more measurement reporting parameters indicating a maximum number of beams to be reported per cell. The method may also include maintaining beam measurements for each of the one or more serving frequencies according to the corresponding determined number of beam measurements to be maintained, for reporting in a measurement report. The method may also include providing user data and forwarding the user data to a host computer via the transmission to the base station.

According to some embodiments, a method implemented in a communication system including a host computer, a base station and a UE configured to perform beam measurements, the method comprises, at the host computer, receiving user data transmitted to the base station from the UE, where the method comprises, at the UE, receiving measurement reporting parameters configuring the UE for reporting measurements and determining, for each of one or more serving frequencies corresponding to a serving cell or a neighboring cell in the serving frequency, a number of beam measurements to be maintained, wherein said determining is based on one or more measurement reporting parameters indicating a maximum number of beams to be reported per cell. The method further includes maintaining beam measurements for each of the one or more serving frequencies according to the corresponding determined number of beam measurements to be maintained, for reporting in a measurement report. The method at the UE may also include providing the user data to the base station. The method at the UE may include executing a client application, thereby providing the user data to be transmitted, and the method at the host computer may include executing a host application associated with the client application. The method at the UE may include executing a client application and receiving input data to the client application, the input data being provided at the host computer by executing a host application associated with the client application, where the user data to be transmitted is provided by the client application in response to the input data.

According to some embodiments, a method implemented in a communication system including a host computer, a base station and a UE configured to perform beam measurements, the method comprises, at the host computer, receiving, from the base station, user data originating from a transmission which the base station has received from the UE, where the method at the UE comprises receiving measurement reporting parameters configuring the UE for reporting measurements and determining, for each of one or more serving frequencies corresponding to a serving cell or a neighboring cell in the serving frequency, a number of beam measurements to be maintained, wherein said determining is based on one or more measurement reporting parameters indicating a maximum number of beams to be reported per cell. The method at the UE may comprise maintaining beam measurements for each of the one or more serving frequencies according to the corresponding determined number of beam measurements to be maintained, for reporting in a measurement report. The method at the base station may include receiving the user data from the UE and initiating a transmission of the received user data to the host computer.

As discussed in detail above, the techniques described herein, e.g., as illustrated in the process flow diagrams of FIGS. 4 and 5, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
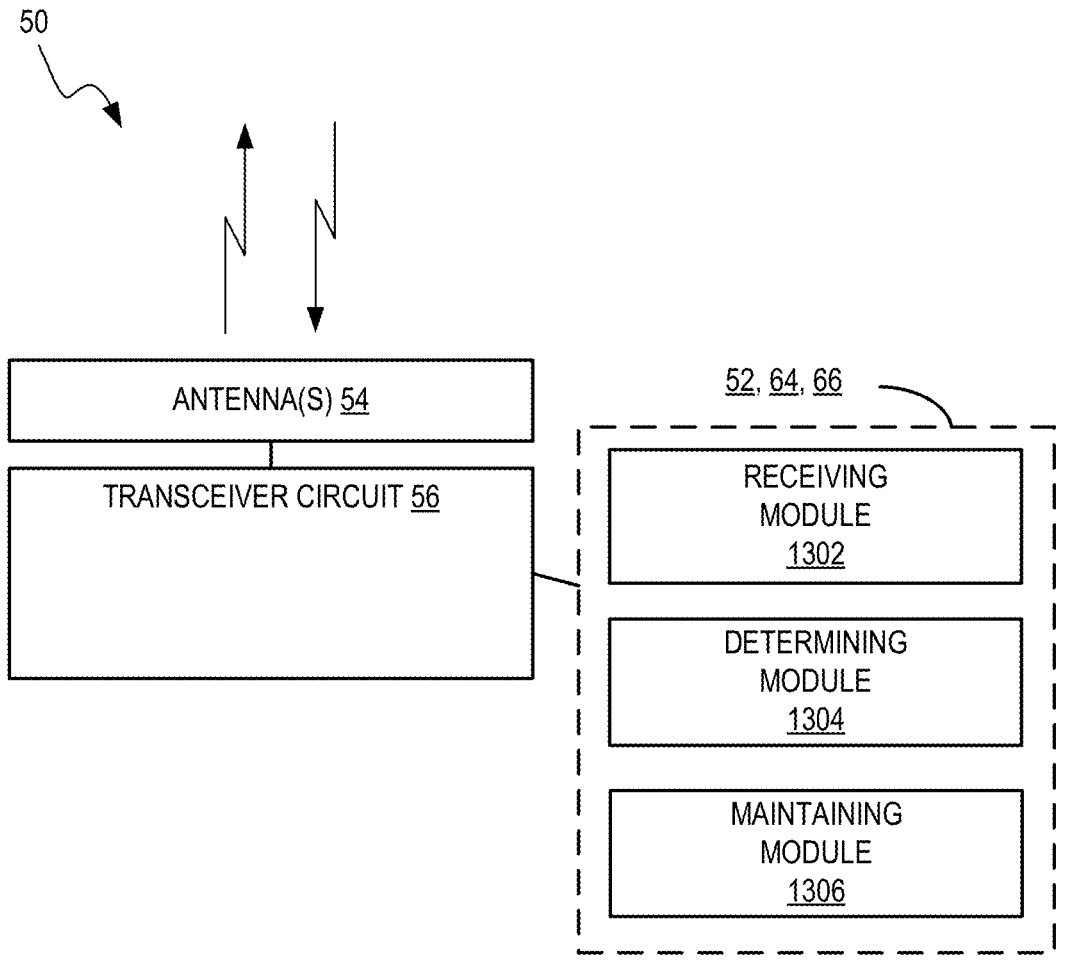
FIG. 13 is a block diagram illustrating a functional implementation of a wireless device, according to some embodiments.

FIG. 13 illustrates an example functional module or circuit architecture as may be implemented in a wireless device 50 adapted for operation in a wireless communication network. The implementation includes a receiving module 1302 for receiving measurement reporting parameters configuring the wireless device for reporting measurements and a determining module 1304 for determining, for each of one or more serving frequencies corresponding to a serving cell or a neighboring cell in the serving frequency, a number of beam measurements to be maintained, where the determining is based on one or more measurement reporting parameters indicating a maximum number of beams to be reported per cell. The functional implementation also includes a maintaining module 1306 for maintaining beam measurements for each of the one or more serving frequencies according to the corresponding determined number of beam measurements to be maintained, for reporting in a measurement report.

In another embodiment, the maintaining module 1306 is for, in response to determining that one of the measurement reporting parameters indicates a maximum number of beam measurements to be reported per cell and another one of the measurement reporting parameters indicates a quantity to be reported, maintaining at least one measurement per beam for one or more serving frequencies of a serving cell, for reporting in a measurement report.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method, in a wireless device, for performing beam measurements, the method comprising:

receiving measurement reporting configuration comprising parameters configuring the wireless device for reporting beam measurements; and, for each of one or more serving frequencies, in response to determining that the measurement reporting parameters include both a first parameter which indicates a maximum number of beam measurements to be reported per cell and a second parameter which indicates a quantity to be reported, maintaining at least one measurement per beam for the serving frequency, for reporting.

2. The method of claim 1, wherein said determining is performed for at least one reference signal type.

3. The method of claim 2, wherein said at least one reference signal comprises a Synchronization Signal Block (SSB) or a Channel-State Information Reference Signal (CSI-RS).

4. The method of claim 1, wherein said determining is performed separately for each of two or more reference signal types.

5. The method of claim 4, wherein said two or more reference signal types comprises a Synchronization Signal Block (SSB) and a Channel-State Information Reference Signal (CSI-RS).

6. The method of claim 1, wherein maintaining at least one measurement per beam for the serving frequency for reporting comprises that the at least one measurement per beam for the serving frequency is being layer 3 (L3) filtered for reporting in a measurement report in response to such measurement report being triggered.

7. The method of claim 1, wherein maintaining at least one measurement per beam for the serving frequency is performed when at least one measurement identifier that has been configured to the wireless device is associated with a measurement reporting configuration that includes both the first and the second parameters.

8. The method of claim 7, wherein the measurement reporting configuration comprises the Radio Resource Control (RRC) information element reportConfigNR.

9. The method of claim 1, wherein maintaining at least one measurement per beam for the serving frequency comprises maintaining at least one measurement per beam for a serving cell in the serving frequency.

10. The method of claim 1, wherein maintaining at least one measurement per beam for the serving frequency comprises maintaining at least one measurement per beam for a best neighbour cell in the serving frequency.

11. A wireless device configured to perform beam measurements, the wireless device comprising:

transceiver circuitry; and processing circuitry operatively associated with the transceiver circuitry and configured to:

receive measurement reporting configuration comprising parameters configuring the wireless device for reporting beam measurements; and, for each of one or more serving frequencies, in response to determining that the measurement reporting parameters include both a first parameter which indicates a maximum number of beam measurements to be reported per cell and a second parameter which indicates a quantity to be reported, maintain at least one measurement per beam for the serving frequency, for reporting.

12. The wireless device of claim 11, wherein the processing circuitry is configured to perform said determining for at least one reference signal type.

13. The wireless device of claim 12, wherein said at least one reference signal comprises a Synchronization Signal Block (SSB) or a Channel-State Information Reference Signal (CSI-RS).

14. The wireless device of claim 11, wherein the processing circuitry is configured to perform said determining separately for each of two or more reference signal types.

15. The wireless device of claim 14, wherein said two or more reference signal types comprises a Synchronization Signal Block (SSB) and a Channel-State Information Reference Signal (CSI-RS).

16. The wireless device of claim 11, wherein the processing circuitry is configured to maintain at least one measurement per beam for the serving frequency for reporting, whereby said maintaining comprises that the at least one measurement per beam for the serving frequency is being layer 3 (L3) filtered for reporting in a measurement report in response to such measurement report being triggered.

17. The wireless device of claim 11, wherein the processing circuitry is configured to perform maintaining of at least one measurement per beam for the serving frequency when at least one measurement identifier that has been configured to the wireless device is associated with a measurement reporting configuration that includes both the first and the second parameters.

18. The wireless device of claim 17, wherein the measurement reporting configuration comprises the Radio Resource Control (RRC) information element reportConfigNR.

19. The wireless device of claim 11, wherein the processing circuitry is configured to maintain at least one measurement per beam for the serving frequency, which comprises maintaining at least one measurement per beam for a serving cell in the serving frequency.

20. The wireless device of claim 11, wherein the processing circuitry is configured to maintain at least one measurement per beam for the serving frequency, which comprises maintaining at least one measurement per beam for a best neighbour cell in the serving frequency.

* * * * *